Patented Oct. 4, 1949

2,483,566

UNITED STATES PATENT OFFICE 2,483,566

CATALYTIC ACYLATION OF AROMATIC COMPOUNDS

Ralph B. Thompson, Riverside, Ill., assignor to Universal Oil Products Company, Chicago, Ill., a corporation of Delaware No Drawing. Application April 30, 1945, Serial No. 591,224

19 Claims. (Cl. 260—592)

This invention relates to a process for producing aromatic ketonic compounds. More particularly this invention relates to the conversion of aromatic hydrocarbons and substituted aromatic hydrocarbons into aromatic carbonyl compounds containing a keto group.

An object of this invention is to produce aromatic keto compounds.

Another object of this invention is to provide a process for acylating an aromatic compound having a replaceable hydrogen atom.

One specific embodiment of this invention relates to a process for producing an aromatic ketonic compound which comprises reacting an acylating agent and an acylatable aromatic compound in the presence of a catalyst comprising an alkane sulfonic acid.

Another embodiment of this invention relates to a process for producing a diaryl ketone which comprises reacting an anhydride of an aryl carboxylic acid and an aromatic hydrocarbon having a replaceable hydrogen atom in the presence of an alkane sulfonic acid.

A further embodiment of this invention relates to a process for producing an alkyl aryl ketone which comprises reacting an anhydride of an aliphatic carboxylic acid and an aromatic hydrocarbon having a replaceable hydrogen atom in the presence of an alkane sulfonic acid.

A still further embodiment of this invention relates to a process for producing an aromatic ketonic compound which comprises reacting an acyl halide and an aromatic compound having a replaceable hydrogen atom in the presence of a catalyst comprising an alkane mono-sulfonic acid.

For some time it has been known that benzene and acetic anhydride will react in the presence of anhydrous aluminum chloride to form acetophenone which is an alkyl aryl ketone. However, in order to obtain a high yield of acetophenone, it is necessary to use at least 2 moles of aluminum chloride for each mole of acetic anhydride reacted and accordingly this method involves considerable expense for such a large amount of aluminum chloride which reacts chemically with the reactants and is not readily recoverable.

I have found that catalytic amounts of an alkyl sulfonic acid are sufficient to promote interaction of an acylating agent such as a carboxylic acid, its anhydride, or acid halide with an aromatic hydrocarbon, a phenol, or an aryl halide to form an aryl ketonic compound such as an alkyl aryl ketone, an alkyl hydroxyaryl ketone, or an alkyl haloaryl ketone. Also, alkane sulfonic acids do not cause oxidation and sulfonation reactions which usually occur in reactions catalyzed by sulfuric acid.

Aromatic compounds utilizable in my process comprise mono-cyclic and poly-cyclic aromatic hydrocarbons, alkyl aromatic hydrocarbons and also substituted aromatic hydrocarbons including aryl halides, phenols, aryl ethers, anilides, etc. These aromatic compounds include benzene, toluene, ethylbenzene, other benzene hydrocarbons having an alkyl group of more than 2 carbon atoms, chlorobenzene, bromobenzene, phenol, cresols, anisole, other alkyl aryl ethers, acetanilide, propionanilide, etc. Such aromatic compounds contain a hydrogen atom chemically combined with the aromatic ring and said hydrogen atom is replaceable by an acyl group.

Suitable acylating agents include carboxylic acids, their anhydrides, and acid halides. I prefer to employ anhydrides and acyl halides of aliphatic monocarboxylic acids although similar derivatives of dicarboxylic and polycarboxylic acids are also sometimes utilized.

Catalysts which are used to promote the process of this invention comprises alkane sulfonic acids and particularly alkane mono-sulfonic acids having the general formula, $C_nH_{2n+1}SO_3H$, in which $n$ is an integer of from 1 to 8, inclusive. The different alkane mono-sulfonic acids are relatively inexpensive since they are readily obtainable by oxidation of mercaptans of the general formula, $C_nH_{2n+1}SH$, thus including methyl mercaptan and higher alkyl mercaptans. The aforementioned alkyl sulfonic acids are mobile high-boiling liquids which are soluble in water and have relatively low solubilities in hydrocarbons.

Alkyl sulfonic acids which are also called alkane mono-sulfonic acids, differ in chemical composition and properties from alkyl hydrogen sulfates which are produced when mono-olefinic hydrocarbons react with sulfuric acid. Alkyl hydrogen sulfates have the general formula $$C_nH_{2n+1}OSO_3H$$

That is, the alkyl group is combined chemically with an oxygen atom and not with a sulfur atom as is the case in my alkyl sulfonic acid catalysts. Also contrary to the behavior of an alkyl sulfonic acid, an alkyl hydrogen sulfate has a relatively high solubility in hydrocarbons and is decomposed of hydrolyzed by water to give sulfuric acid and an alcohol.

Although I prefer to employ an alkane monosulfonic acid as catalyst in the process of this invention, other alkane sulfonic acids are also utilizable and these include alkane disulfonic acids and other alkane poly-sulfonic acids. Typical alkane disulfonic acid catalysts are methane-disulfonic acid which is sometimes referred to as methionic acid; 1,1-ethane-disulfonic acid; 1,2-ethane-disulfonic acid; propane-1,2-disulfonic acid; 2-methylpropane-1,2-disulfonic acid; methane-trisulfonic acid, etc. These different polysulfonic acids including methionic acid are strong acids which are relatively stable toward heat, acids, and alkali, and may be distilled at subatmospheric pressures. The alkane sulfonic acids including alkane mono-sulfonic, disulfonic, and poly-sulfonic acids are utilizable as catalysts either alone, or in admixture with one another.

Acylation of an aromatic compound is carried out in either batch or continuous types of operation. Thus in batch type operation the aromatic compound and acylating agent are contacted at a temperature of from about 0° to about 175° C. in the presence of an alkane sulfonic acid catalyst in a reactor provided with suitable means for effecting intimate contact of the reactants and catalyst and for controlling the reaction temperature. After the reaction has occurred, the unconverted starting material is separated from the used catalyst in which the ketonic reaction products are soluble, this solubility being due to the formation of oxonium salts between the ketones and alkane sulfonic acid. Water is added to the used catalyst in order to effect separation of the ketones from an aqueous solution of the alkane sulfonic acid. The ketones are recovered and the aqueous solution of the alkane sulfonic acid is concentrated and charged again to the process together with fresh and recovered aromatic compound and acylating agent.

Continuous interaction of an aromatic compound and an acylating agent to produce ketonic compounds is carried out by passing an aromatic compound such as an aromatic hydrocarbon, a phenol or an aryl halide, an acylating agent, and an alkyl sulfonic acid through a reactor maintained at a temperature of from about 0° to about 175° C. and provided with baffles or other mixing means whereby acylation of the aromatic compound occurs, producing a ketonic compound. From the reactor the reaction mixture is then directed to a separating zone in which the alkyl sulfonic acid catalyst is separated from the organic reaction products and the latter are then conducted to further separation and fractionation to obtain the desired aromatic ketonic compound such as an alkyl aryl ketone, an alkyl hydroxyaryl ketone, or alkyl haloaryl ketone, the latter two being obtainable by the acylation of a phenol or an aryl halide.

The following examples are given to illustrate the character of results obtained by the use of the present process although these data are not introduced with the intention of unduly restricting the generally broad scope of the invention.

*Example I*

50 grams of benzene and 43 grams of ethyl sulfonic acid ($C_2H_5SO_3H$) were placed in a reactor provided with a mechanically driven stirrer and heated to the boiling point of benzene while 20 grams of acetic anhydride was introduced thereto during a period of 30 minutes. Heating of the reaction mixture was continued under a reflux condenser for 12 hours, and at the end of this time water was added to the reaction mixture to cause the separation of two layers. From the upper layer 5 grams of acetophenone was obtained. The presence of this alkyl aryl ketone was proven by preparation of its semicarbazone which did not depress the melting point of an authentic sample of acetophenone semicarbazone.

*Example II*

A mixture of butyl mercaptans recovered in the refining of petroleum was oxidized by means of nitric acid to a mixture of butyl sulfonic acids. 50 grams of the butyl sulfonic acid mixture and 47 grams of phenol were stirred at 85° to 90° C. while 45 grams of acetyl chloride was added thereto over a period of 30 minutes. The stirring and heating treatment was continued for an additional period of 3 hours after which 15.4 grams of p-hydroxy acetophenone was isolated from the reaction mixture.

The novelty and utility of the process of the present invention are evident from the preceding specification and examples, although neither section is intended to limit unduly its generally broad scope.

I claim as my invention:

1. A process for producing an aromatic ketonic compound which comprises reacting an acylating agent and an acylatable aromatic compound selected from the group consisting of aromatic hydrocarbons, phenols, aryl halides, aryl ethers and anilides, in the presence of a non-carboxylic alkane sulfonic acid.

2. A process for producing an alkyl aryl ketone which comprises reacting an acylating agent and an aromatic hydrocarbon in the presence of a catalyst comprising essentially a non-carboxylic alkane sulfonic acid.

3. A process for producing an alkyl hydroxyaryl ketone which comprises reacting an acylating agent and a phenol in the presence of a catalyst comprising essentially a non-carboxylic alkane sulfonic acid.

4. A process for producing an alkyl halo-aryl ketone which comprises reacting an acylating agent and an aryl halide in the presence of a catalyst comprising essentially a non-carboxylic alkane sulfonic acid.

5. A process for producing an aromatic ketonic compound which comprises reacting an acylating agent and an acylatable aromatic compound selected from the group consisting of aromatic hydrocarbons, phenols, aryl halides, aryl ethers and anilides, in the presence of a non-carboxylic alkane mono-sulfonic acid.

6. A process for producing an aromatic ketonic compound which comprises reacting an acylating agent and an acylatable aromatic compound selected from the group consisting of aromatic hydrocarbons, phenols, aryl halides, aryl ethers and anilides, in the presence of a non-carboxylic alkane poly-sulfonic acid.

7. A process for producing an alkyl aryl ketone which comprises reacting an acylating agent and an aromatic hydrocarbon at a temperature of from about 0° to about 175° C. in the presence of a non-carboxylic alkane mono-sulfonic acid.

8. A process for producing an alkyl hydroxyaryl ketone which comprises reacting an acylating agent and a phenol at a temperature of from about 0° to about 175° C. in the presence of a non-carboxylic alkane mono-sulfonic acid.

9. A process for producing an alkyl halo-aryl ketone which comprises reacting an acylating agent and an aryl halide at a temperature of from about 0° to about 175° C. in the presence of a non-carboxylic alkane mono-sulfonic acid.

10. A process for producing an aromatic ketonic compound which comprises reacting a carboxylic acid and an acylatable aromatic compound selected from the group consisting of aromatic hydrocarbons, phenols, aryl halides, aryl ethers and anilides, at a temperature of from about 0° to about 175° C. in the presence of a catalyst comprising essentially a non-carboxylic alkane sulfonic acid.

11. A process for producing an aromatic ketonic compound which comprises reacting an acyl halide and an acylatable aromatic compound selected from the group consisting of aromatic hydrocarbons, phenols, aryl halides, aryl ethers and anilides, at a temperature of from about 0° to about 175° C. in the presence of a catalyst comprising essentially a non-carboxylic alkane sulfonic acid.

12. A process for producing an aromatic ketonic compound which comprises reacting an anhydride of a carboxylic acid and an acylatable aromatic compound selected from the group consisting of aromatic hydrocarbons, phenols, aryl halides, aryl ethers and anilides, at a temperature of from about 0° to about 175° C. in the presence of a catalyst comprising essentially a non-carboxylic alkane sulfonic acid.

13. A process for producing an aromatic ketonic compound which comprises reacting a carboxylic acid and an acylatable aromatic compound selected from the group consisting of aromatic hydrocarbons, phenols, aryl halides, aryl ethers and anilides, at a temperature of from about 0° to about 175° C. in the presence of a catalyst comprising essentially a non-carboxylic alkane monosulfonic acid having from 1 to about 8 carbon atoms per molecule.

14. A process for producing an aromatic ketonic compound which comprises reacting an acyl halide and an acylatable aromatic compound selected from the group consisting of aromatic hydrocarbons, phenols, aryl halides, aryl ethers and anilides, at a temperature of from about 0° to about 175° C. in the presence of a catalyst comprising essentially a non-carboxylic alkane mono-sulfonic acid having from 1 to about 8 carbon atoms per molecule.

15. A process for producing an aromatic ketonic compound which comprises reacting an anhydride of a carboxylic acid and an acylatable aromatic compound selected from the group consisting of aromatic hydrocarbons, aryl halides, aryl ethers and anilides, at a temperature of from about 0° to about 175° C. in the presence of a non-carboxylic alkane mono-sulfonic acid having from 1 to about 8 carbon atoms per molecule.

16. A process for producing an alkyl phenyl ketone which comprises reacting a benzene hydrocarbon and an anhydride of an alkyl monocarboxylic acid at a temperature of from about 0° to about 175° C. in the presence of a catalyst comprising essentially a non-carboxylic alkane mono-sulfonic acid.

17. A process for producing an alkyl phenyl ketone which comprises reacting a benzene hydrocarbon and an acyl halide of an alkane monocarboxylic acid at a temperature of from about 0° to about 175° C. in the presence of a catalyst comprising essentially a non-carboxylic alkane mono-sulfonic acid.

18. A process for producing acetophenone which comprises reacting benzene and acetic anhydride at a temperature of from about 0° to about 175° C. in the presence of a catalyst comprising essentially a non-carboxylic alkane monosulfonic acid having from 1 to 8 carbon atoms per molecule.

19. A process for producing p-hydroxy acetophenone which comprises reacting phenol and acetyl chloride at a temperature of from about 0° to about 175° C. in the presence of a catalyst comprising essentially a non-carboxylic butyl sulfonic acid.

RALPH B. THOMPSON.

REFERENCES CITED

The following references are of record in the file of this patent:

UNITED STATES PATENTS

| Number | Name | Date |
| --- | --- | --- |
| 1,999,538 | Groggins et al. | Apr. 30, 1935 |
| 2,254,212 | Dinwiddie | Sept. 2, 1941 |
| 2,333,701 | Cockerille | Nov. 9, 1943 |

FOREIGN PATENTS

| Number | Country | Date |
| --- | --- | --- |
| 327,128 | Germany | Oct. 7, 1920 |

OTHER REFERENCES

Schneider Berichte, 55 B, pages 1892-9 (1922), Abstracted in Chem. Abst. vol. 17, page 85 (1923).

Boeseken, Rec. trav. chim., vol. 46, pages 574-581 (1927).

Tutin, Chemical Society Journal, vol. 95, pages 663-668 (1909).